(12) United States Patent
Angoua et al.

(10) Patent No.: US 12,442,979 B2
(45) Date of Patent: Oct. 14, 2025

(54) OPTICAL WAVEGUIDE FORMED WITHIN IN A GLASS LAYER

(71) Applicant: Intel Corporation, Santa Clara, CA (US)

(72) Inventors: Bainye Francoise Angoua, Phoenix, AZ (US); Ala Omer, Phoenix, AZ (US); Sarah Blythe, Phoenix, AZ (US); Junxin Wang, Gilbert, AZ (US); Whitney Bryks, Tempe, AZ (US); Dilan Seneviratne, Chandler, AZ (US); Jieying Kong, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 17/482,380

(22) Filed: Sep. 22, 2021

(65) Prior Publication Data

US 2023/0091834 A1    Mar. 23, 2023

(51) Int. Cl.
*G02B 6/125*    (2006.01)
*G02B 6/13*    (2006.01)

(52) U.S. Cl.
CPC ............... *G02B 6/125* (2013.01); *G02B 6/13* (2013.01)

(58) Field of Classification Search
CPC .......... G02B 6/125; G02B 6/13; G02B 6/136; G02B 6/122; G02B 2006/12038; G02B 2006/121
See application file for complete search history.

(56) References Cited

U.S. PATENT DOCUMENTS 8,000,565 B2 *   8/2011   Liu ................... G02B 6/12004
                                                            385/132
2003/0033975 A1   2/2003   Bazylenko et al.

OTHER PUBLICATIONS

Office Action from European Patent Application No. 22184114.1, mailed Mar. 26, 2025, 7 pgs.

* cited by examiner

*Primary Examiner* — John Bedtelyon
(74) *Attorney, Agent, or Firm* — Schwabe, Williamson & Wyatt P.C.

(57) ABSTRACT

Embodiments described herein may be related to apparatuses, processes, and techniques directed an optical waveguide formed in a glass layer. The optical waveguide may be formed by creating a first trench extending from a surface of the glass layer, and then creating a second trench extending from the bottom of the first trench, then subsequently filling the trenches with a core material which may then be topped with a cladding material. Other embodiments may be described and/or claimed.

25 Claims, 13 Drawing Sheets

OPTICAL WAVEGUIDE FORMED WITHIN IN A GLASS LAYER

FIELD

Embodiments of the present disclosure generally relate to the field of semiconductor packaging, and in particular optical circuitry within a package.

BACKGROUND

Continued growth in computing and mobile devices will increase the demand for optical connectivity between dies within semiconductor packages.

DETAILED DESCRIPTION

Figure 1:
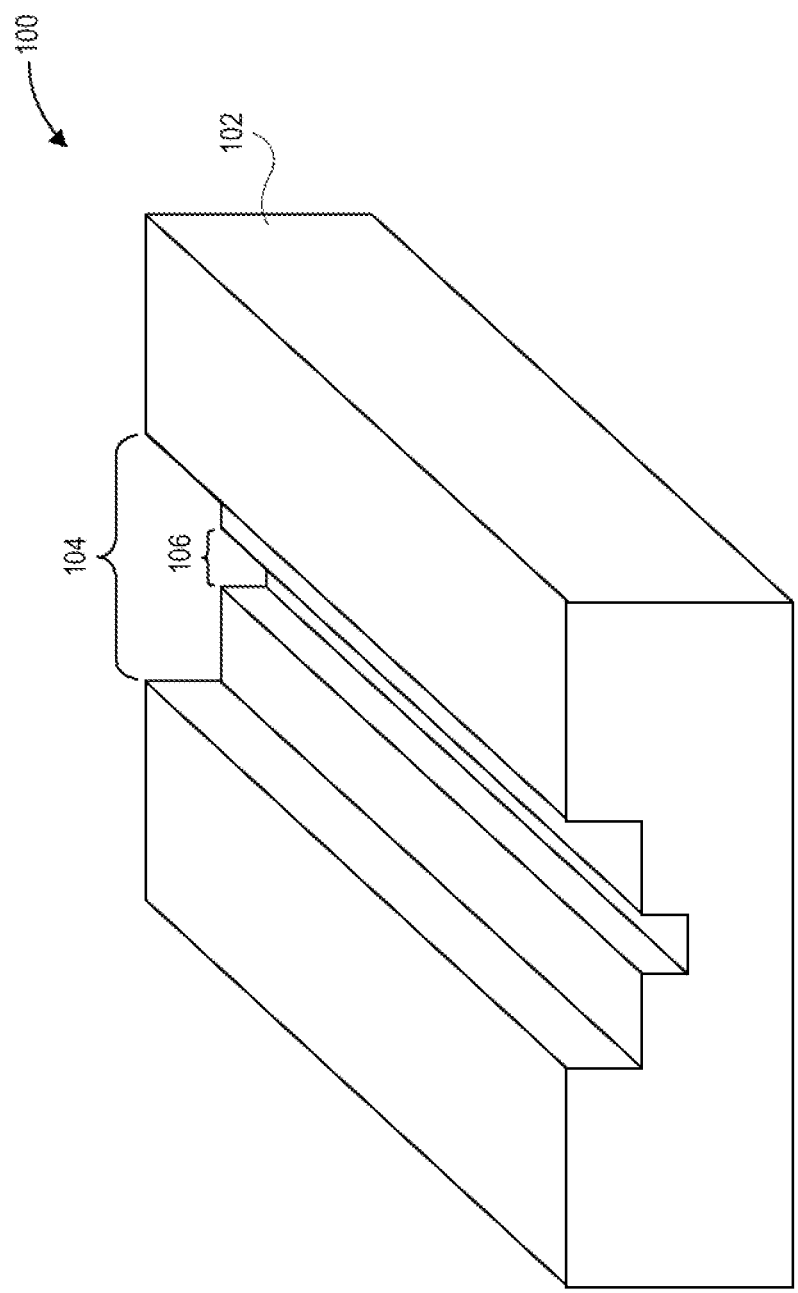
FIG. 1 illustrates a diagram of a perspective view of an optical waveguide structure formed within a glass layer, in accordance with various embodiments.

Embodiments described herein may be related to apparatuses, processes, and techniques for forming an optical waveguide in a glass layer. In embodiments, such an optical waveguide may be referred to as a reverse ribbed waveguide. In embodiments, the optical waveguide may be formed by creating a first trench extending from a surface of the glass layer, and then creating a second trench extending from the bottom of the first trench. The trenches may then be subsequently filled with a core material that conducts light. The core material may then be topped with a cladding material.

Optical connectivity on a substrate package is used to connect various devices, for example to optically couple a chip, which is typically a PIC, within a semi-conductor package with an optical connector on the side of the package. This optical connector may then be used to route optical signals to other components within, for example a computer rack or other components within a larger computing environment. Legacy optical conductivity challenges for waveguides on a substrate of the package include achieving a high coupling efficiency and optical interfaces, fabricating optical waveguides, and achieving low signal loss while routing the optical signals through bends and turns within the optical waveguides.

Legacy implementations of a waveguide may include a rib structure that is built up on top of a core structure. In embodiments, the techniques described herein may be directed to etching a core on top of a rib into a glass layer or substrate, which may be referred to as a "reverse ribbed" waveguide structure. In embodiments, fabricating a geometry into the surface of a glass layer, or glass substrate, allows for evanescent coupling to a vertically connected PIC, or direct lateral coupling to an adjacent PIC. Evanescent coupling is enabled by the close physical proximity of a vertically connected PIC to the reverse ribbed waveguide, where top cladding, in embodiments approximately 1 µm or less and described further below, enables a sufficiently small gap to support direct coupling between the PIC and the reversed ribbed waveguide. In embodiments discussed further below, ultraviolet (UV) femtosecond laser patterning or masked UV exposure of photosensitive glass techniques may be used to form the desired waveguide geometry that is etched out of the surface of a glass layer. After the etching, the waveguide may then be filled with a higher refractive index core material and covered with a cladding.

In embodiments, techniques may achieve tighter bends with lower optical losses than a legacy waveguide structure built without the rib feature. For example, 500 to 1200 µm radius curvature bends may be achieved with minimal losses using these techniques. As a result, embodiments using these techniques facilitate integration within a glass-based substrate with tighter routing, enabling either a greater number of optical input/output (I/O), reduced substrate space requirements, or both. The geometry of the reversed ribbed waveguide facilitates the waveguide core to be brought into closer physical contact with a die such as a PIC for more efficient optical coupling.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

FIG. 1 illustrates a diagram of a perspective view of an optical waveguide structure formed within a glass layer, in accordance with various embodiments. Optical waveguide 100 may include a glass layer 102, into which a first trench 104 may be formed. A second trench 106 may then be formed at the bottom of the first trench 104. In embodiments, the second trench 106 will be used to form a rib of an optical waveguide and the first trench 104 will be used to form the core of the waveguide.

In embodiments, the glass layer 102 may be a glass layer that may be used as a glass core or a glass substrate. In embodiments, the glass layer 102 may have a majority content of silicon and oxygen, and minority constituents that may include but are not limited to boron, aluminum, sodium, potassium, magnesium, calcium, barium, and/or strontium. In other embodiments, the glass layer 102 may include photo structural glass that may use UV-based exposure fabrication techniques to form the first trench 104 and second trench 106, as discussed further below. In some fabrication techniques, both the first trench 104 and the second trench 106 may be formed at the same time.

If the glass layer 102 is a photo structural glass, then it may be a lithium aluminosilicate glass that reacts with UV light exposure. Subsequently, upon thermal annealing, the UV exposed regions of the glass layer 102, in particular first trench 104 and second trench 106, may turn into a crystallized state that include lithium silicates. These lithium silicates may dissolve in hydrofluoric acid (HF) at a rate that is up to 30 times faster than the surrounding glass, so that the UV exposed regions may be quickly etched out using a dilute HF bath with high selectivity.

As shown with respect to optical waveguide 100, the second trench 106 may be centered between the walls of first trench 104 as shown. In other embodiments, including those discussed with respect to FIG. 2, the second trench 106 may be positioned closer to one of the walls of first trench 104 as compared to the other wall of the first trench 104. A depth of the second trench 106, as well as a depth of the first trench 104 may be selected based upon desired optical transmission qualities and wavelengths in the final waveguide structure 100. In embodiments, a width, as well as a depth, of the second trench 106 may vary along the waveguide structure 100. Similarly, a width, as well as a depth, of the first trench 104 may vary as well along the waveguide structure 100.

Figure 2:
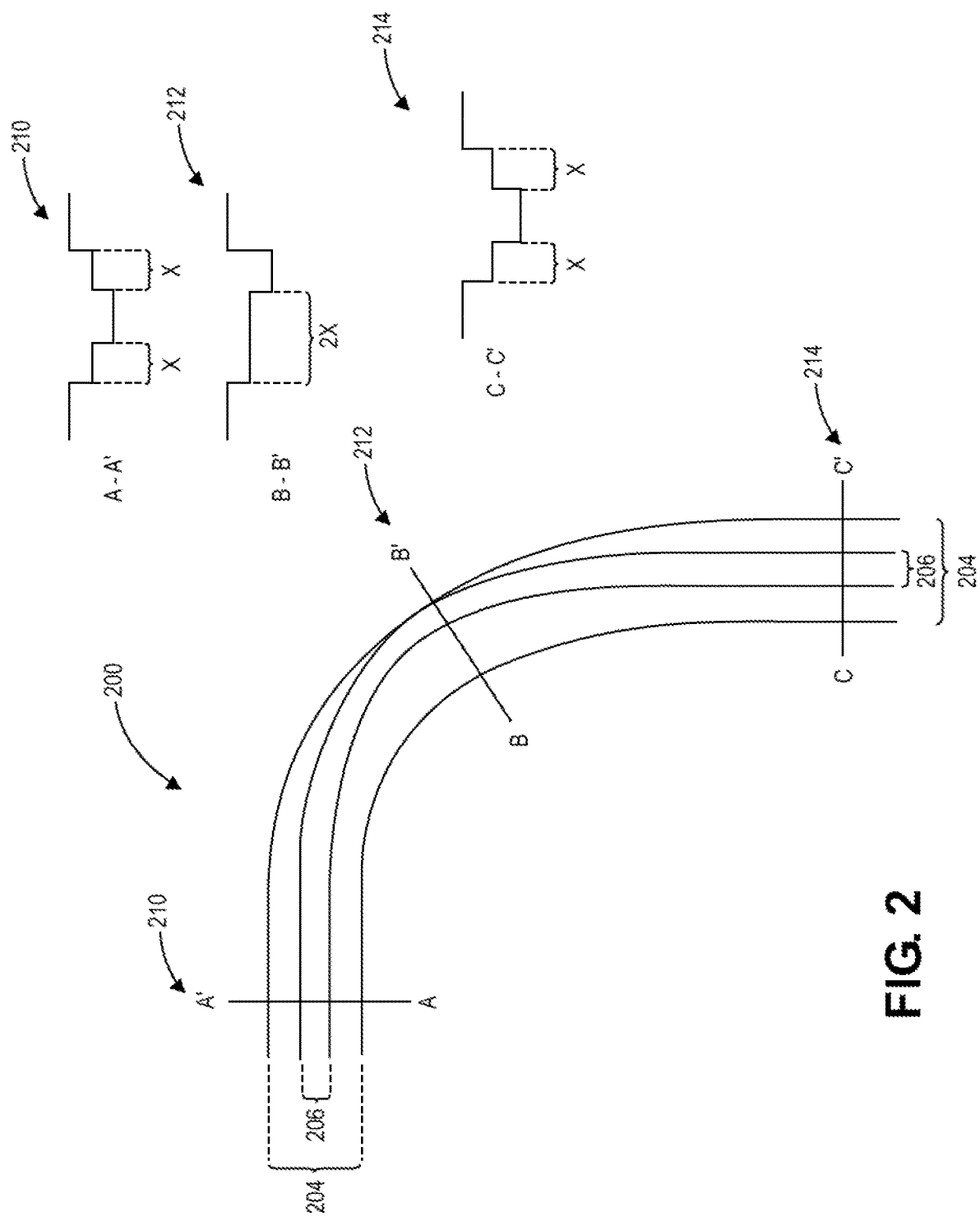
FIG. 2 illustrates a top-down view and cross-section side views of an optical waveguide structure that bends within a glass layer, in accordance with various embodiments.

FIG. 2 illustrates a top-down view and cross-section side views of an optical waveguide structure that bends within a glass layer, in accordance with various embodiments. Optical waveguide 200, which may be similar to optical waveguide 100 of FIG. 1, includes a turn, or a bend, in the direction of the waveguide 200. As shown, waveguide 200 makes a 90° turn between cross-section A-A' 210 and cross-section C-C' 214. As shown, the width of the first trench 204 and the second trench 206, which may be similar to first trench 104 and second trench 106 of FIG. 1, remains fairly constant through the turn, although in other embodiments this may not be the case.

At A-A' 210, the position of second trench 206 in relation to first trench 204 is centered, with second trench 206 having a distance x from either wall of the first trench 204. At B-B' 212, at the midpoint of the bend, the second trench 206 has moved over to become coplanar with one wall of the first trench 204 and having distance 2x from the other wall of the first trench 204. At C-C' 214, the second trench 206 has re-centered, having a distance x from either wall of the first trench 204. Optical waveguide 200 shows just one embodiment of the relationships between positioning of the first trench 204 and the second trench 206. In other embodiments, the width and/or depth of the first trench 204 and/or the second trench 206 may change during a bend, or during some other waveguide geometry within a glass layer such as glass layer 102 of FIG. 1.

Figure 3:
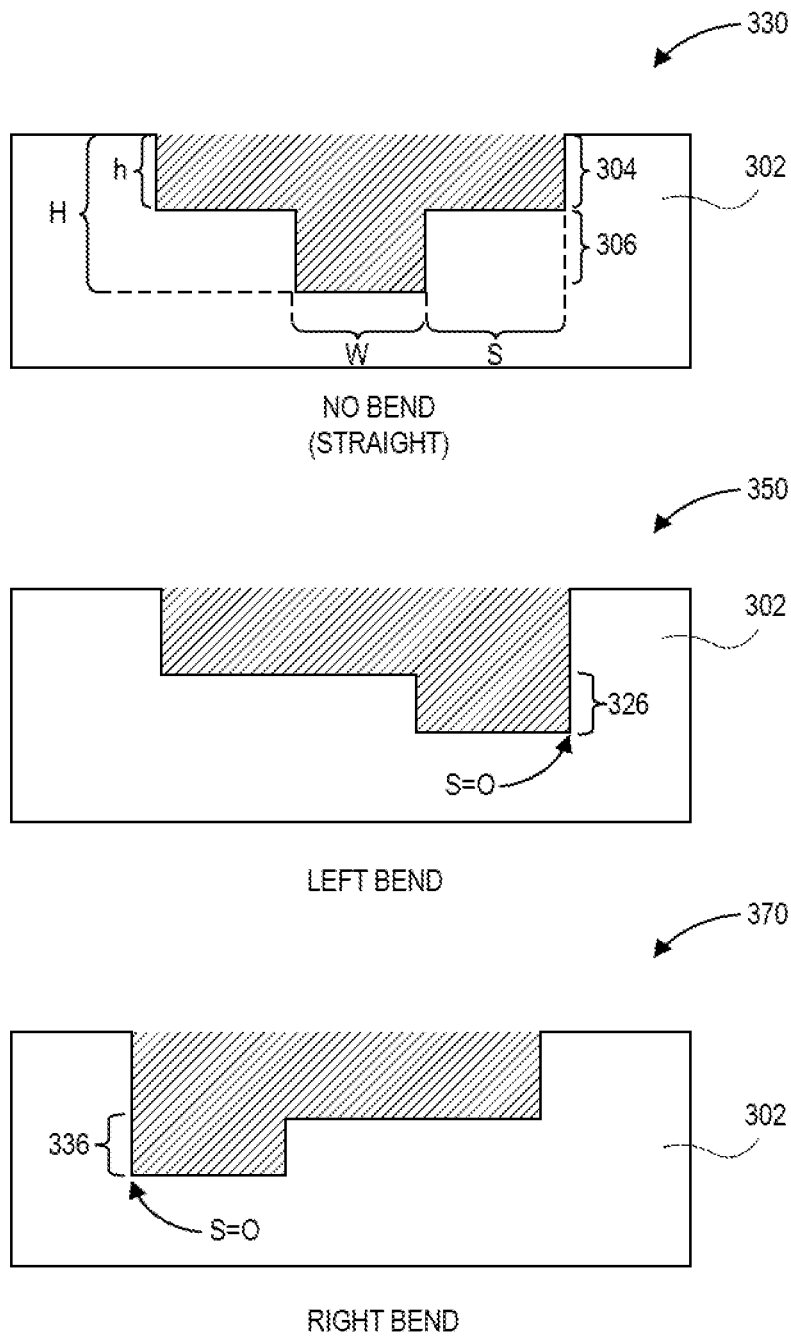
FIG. 3 illustrates cross-section side views of various optical waveguide geometries formed within the glass layer, in accordance with various embodiments.

FIG. 3 illustrates cross-section side views of various optical waveguide geometries formed within the glass layer, in accordance with various embodiments. Optical waveguide 330 is shown within glass layer 302, which may be similar to glass layer 102 of FIG. 1. The upper trench 304, which may be similar to upper trench 204 of FIG. 2, may have a height of h. An overall height of the upper trench 304 and the lower trench 306, which may be similar to lower trench 204 of FIG. 2, may be referred to as H. A width of lower trench 306 may be referred to as W. A distance between one of the walls of the upper trench 304 and the lower trench 306 may be a distance referred to as S. These various parameters of h, H, W, and S define the geometry of the waveguide 330 and the various properties of light propagation that may occur within the waveguide 330. In embodiments, these parameters may vary in the 0 to ~20 micrometer range. Note that the upper trench 304 may be referred to as the waveguide core, and the lower trench 306 may be referred to as the waveguide rib.

Optical waveguide 350, which may represent an optical waveguide left bend, shows an embodiment where the lower trench 326 is moved all the way to the right, resulting in a S value of zero. Optical waveguide 370, which may represent an optical waveguide right bend, shows an embodiment where the lower trench 336 is moved all the way to the left, resulting in an S value of zero. In embodiments, S parameters that approach zero may help with optical losses throughout a bend. The examples of optical waveguide 350 and optical waveguide 370 show examples of asymmetric bending sections of an optical waveguide. In embodiments, implementing this geometry and asymmetric bending sections may be used to achieve a lower bending radius of curvature of a waveguide for a given transition loss, or may simply result in lower losses at a same curvature.

Figure 4A:
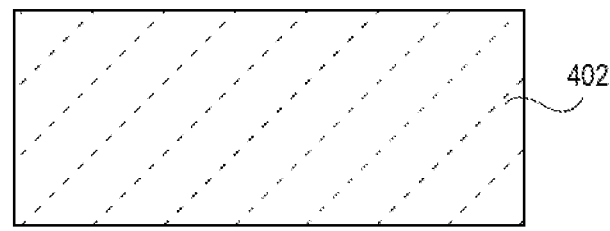
FIGS. 4A-4G illustrate stages in a manufacturing process for creating an optical waveguide structure formed within a glass layer, in accordance with various embodiments.

FIGS. 4A-4G illustrate stages in a manufacturing process for creating an optical waveguide structure formed within a glass layer, in accordance with various embodiments. FIG. 4A shows a stage in the manufacturing process where a glass layer 402, which may be similar to glass layer 102 of FIG. 1, is identified. In embodiments, the glass layer 402 may be a photo structurable glass.

Figure 4B:
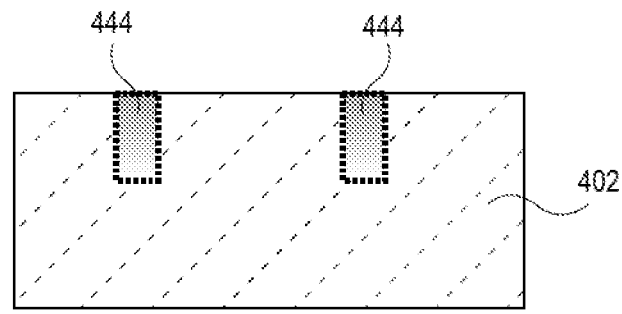

FIG. 4B shows a stage in the manufacturing process where a first pass of a UV femtosecond laser (not shown) is made to expose a first portion 444 of the waveguide structure. This first portion 444 of the waveguide structure may correspond in part to the second trench 206 of FIG. 2.

Figure 4C:
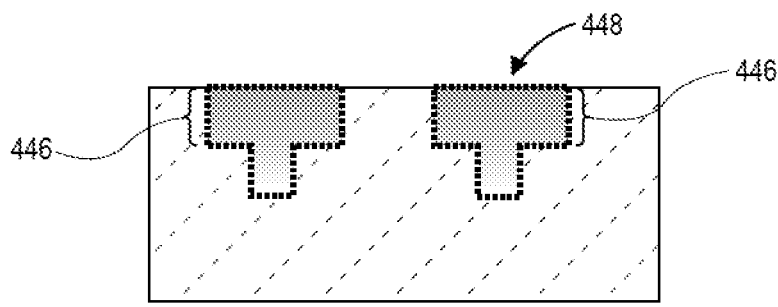

FIG. 4C shows a stage in the manufacturing process where a second pass of a UV femtosecond laser (not shown) is made to expose second portions 446 of the waveguide structure. Note that areas of the exposed first portion 444 and the exposed second portion 446 may overlap creating laser exposed region 448. Note also that the stages in the manufacturing process described in FIG. 4B and FIG. 4C may be reversed in order.

Figure 4D:
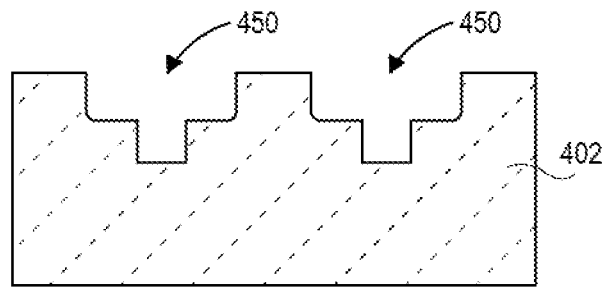

FIG. 4D shows a stage in the manufacturing process where a dilute HF etch is applied to remove the laser exposed regions 448, while etching the non-patterned glass of the glass substrate 402 minimally. The result is cavities 450 within the glass layer 402.

Figure 4E:
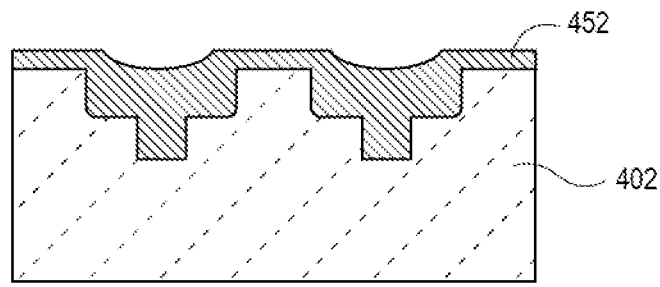

FIG. 4E shows a stage in the manufacturing process where a waveguide core material 452 is deposited on the surface of the glass layer 402, and filling cavities 450 from FIG. 4D. The core material 452 may be either a coating of an organic material, applied using, for example, spin or slit-coating. In embodiments, and inorganic material, such as SiNx, may be applied using a chemical vapor deposit (CVD) or a physical vapor deposition (PVD) process. In embodiments, a target refractive index of the core material is around 1.55, or in embodiments may be higher.

Figure 4F:
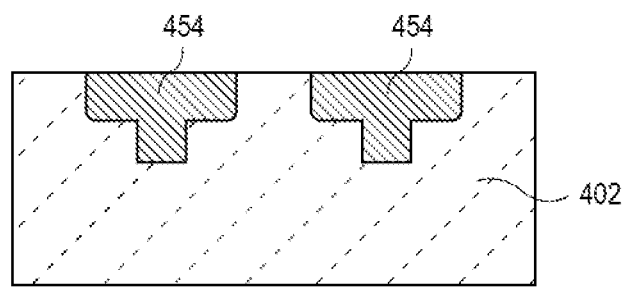

FIG. 4F shows a stage in the manufacturing process where excess core material 452 is removed from the surface of the glass layer 402, leaving a core filled waveguide 454. In embodiments, this removal may be accomplished by a chemical mechanical polishing (CMP) process.

Figure 4G:
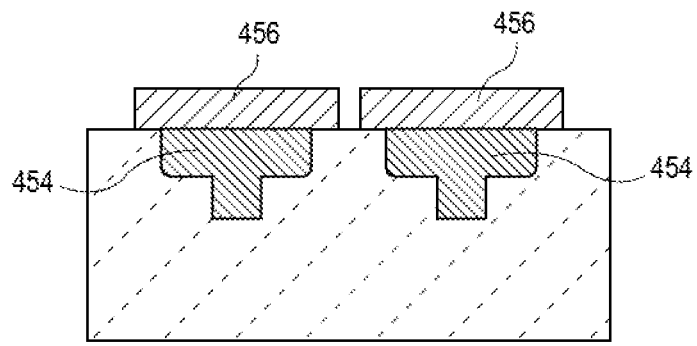

FIG. 4G shows a stage in the manufacturing process where a cladding 456 is applied on top of the core filled waveguide 454. In embodiments, the cladding may have a n of around 1.5, which may be same as the glass clad. In embodiments, an organic wet-coatable cladding material may be used, that may have UV sensitivity. This allows for the cladding material 456 to be deposited, and then selectively exposed to UV light (such as from a mask), and the undesirable part of the pattern removed by a developer chemistry, such that only cladding material 456 remains on top of 454 core material. In separate embodiments, the thickness of the cladding may be only ~2 μm or less to facilitate evanescent coupling. In embodiments, the cladding 456 may not be selectively exposed or developed away.

Figure 5A:
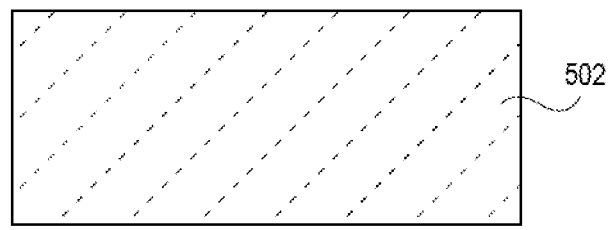
FIGS. 5A-5H illustrate stages in another manufacturing process for creating an optical waveguide structure formed within a glass layer, in accordance with various embodiments.

FIGS. 5A-5H illustrate stages in another manufacturing process for creating an optical waveguide structure formed within a glass layer, in accordance with various embodiments. FIG. 5A shows a stage in the manufacturing process where a glass layer 502, which may be similar to glass layer 102 of FIG. 1, is identified. In embodiments, the glass layer 502 may be a photo structurable glass.

Figure 5B:
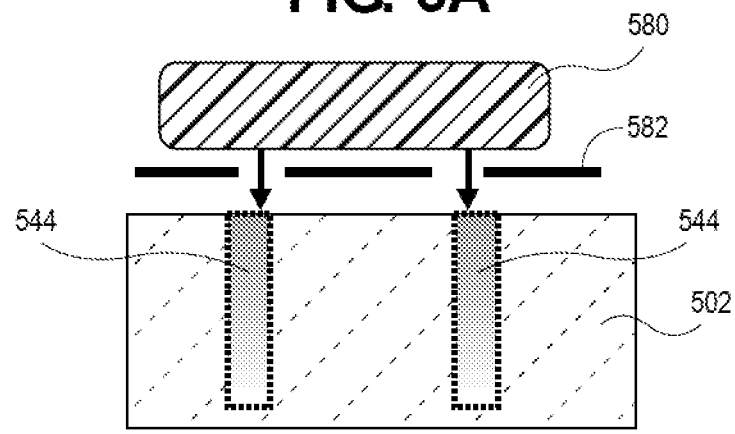

FIG. 5B shows a stage in the manufacturing process where a first mask 582 is applied in order to mask exposure of a UV light source 580 on regions 544 of the glass layer 502. Note that UV absorption events within the glass layer 502 may decline as a function of depth. As a result, UV light from the UV light source 580 is not confined to a particular Z-direction through the glass layer 502. The regions 544 of the glass layer 502 may correspond in part to the second trench 206 of FIG. 2.

Figure 5C:
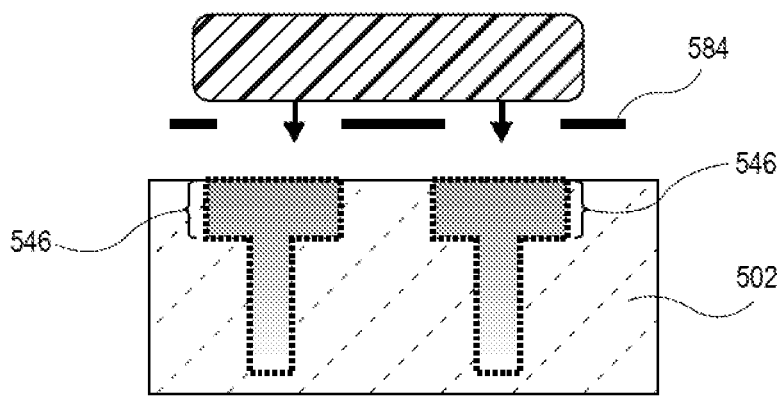

FIG. 5C shows a stage in the manufacturing process where another mask 584 is applied in order to mask exposure of the UV light source 580 on regions 546 of the glass layer 502. Note that areas of the exposed first portion 544 and the exposed second portion 546 may overlap. Note also that the stages in the manufacturing process described in FIG. 5B and FIG. 5C may be reversed in order.

Figure 5D:
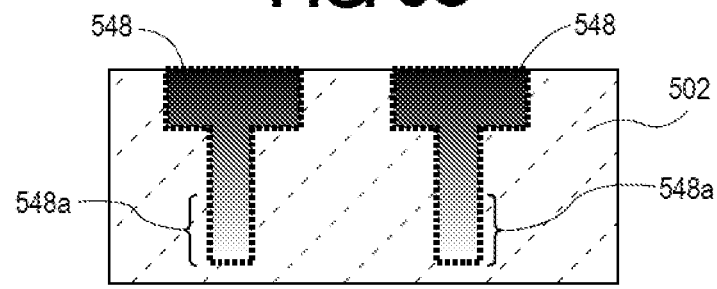

FIG. 5D shows a stage in the manufacturing process where a thermal annealing process is applied that forms a high etch rate crystalline state 548 in the exposed regions of the glass layer 502. The high etch rate crystalline state 548 may include lithium silicates. In embodiments, the thermal annealing process may reach temperatures of around 500° C. Note that there may be reduced amount of crystalline lithium silicates 548a deeper within the glass layer 502 such that the highly etchable crystalline state 548 used to define the rib feature may taper out compositionally in the Z-direction moving downwards.

Figure 5E:
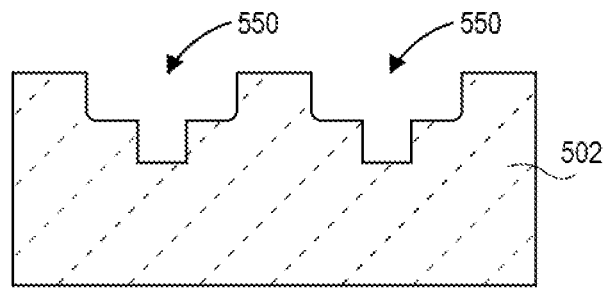

FIG. 5E shows a stage in the manufacturing process where a dilute HF etch is applied to remove a portion of the crystalline state 548, while etching the non-patterned glass of the glass substrate 502 minimally. The result are cavities 550 within the glass layer 502. Note that the dilute HF etch process may be controlled so that the portion 548a of the crystalline state 548 in FIG. 5D may not be etched. In this way, the process may control the depth of etching.

Figure 5F:
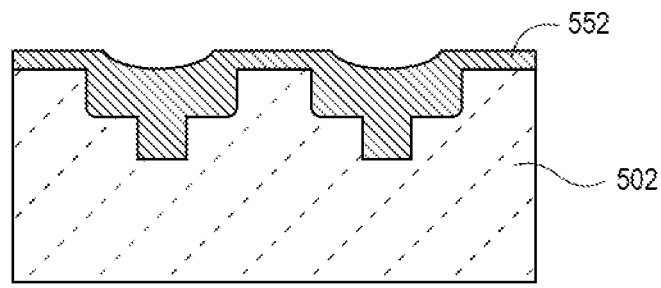

FIG. 5F shows a stage in the manufacturing process where a core material 552 is deposited on the surface of the glass layer 502 and filling cavities 550 from FIG. 5E. The core material 552 may be either a coating of an organic material, applied using, for example, spin or slit-coating. In embodiments, an inorganic material, such as SiNx, may be applied using a chemical vapor deposit (CVD) or a physical vapor deposition (PVD) process. In embodiments, a target refractive index of the core material is around 1.55, or in embodiments may be higher.

Figure 5G:
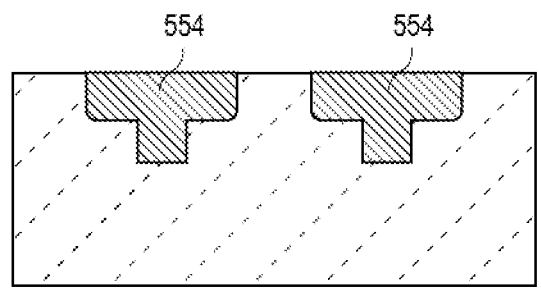

FIG. 5G shows a stage in the manufacturing process where excess core material 552 is removed from the surface of the glass layer 502, leaving a core filled waveguide 554. In embodiments, this removal may be accomplished by a chemical mechanical polishing (CMP) process.

Figure 5H:
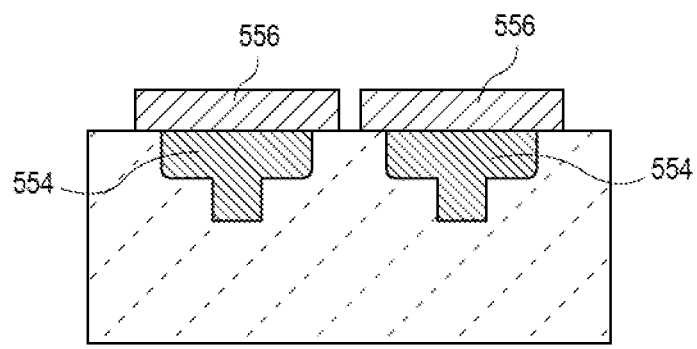

FIG. 5H shows a stage in the manufacturing process where a cladding 556 is applied on top of the core filled waveguide 554. In embodiments, the cladding may have a refractive index of around 1.5. In embodiments, an organic wet-coatable cladding material may be used that has UV sensitivity such that only areas on top of the core filled waveguide 554 need to be retained.

Figure 6:
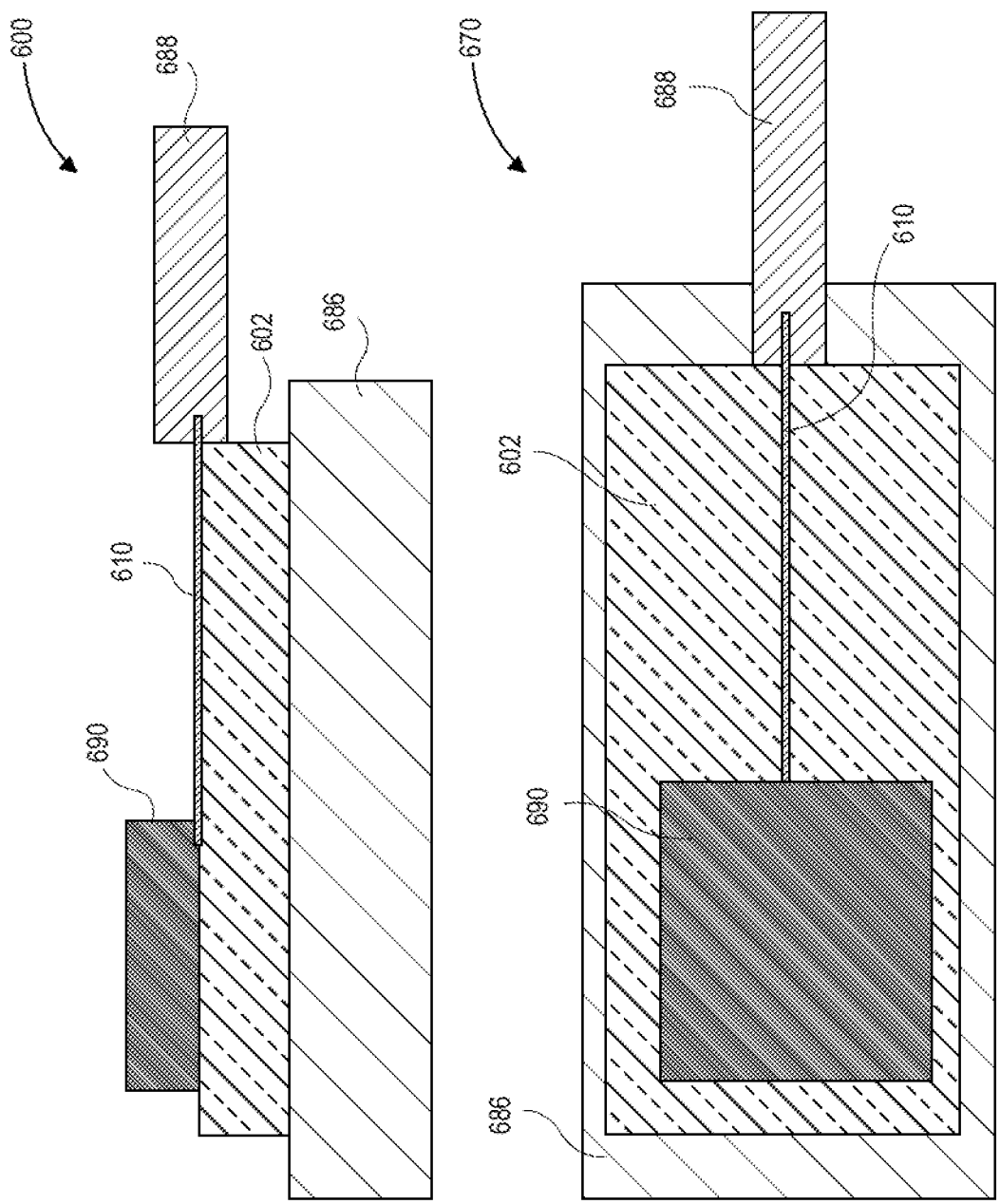
FIG. 6 illustrates a cross-section side view and a top-down view of a package that includes a photonic integrated circuit (PIC) optically coupled with an optical waveguide within a glass layer, in accordance with various embodiments.

Note that other processes and/or techniques that may be used to create trenches within a glass layer, such as glass layer 502, are described with respect to FIG. 9 below FIG. 6 illustrates a cross-section side view and a top-down view of a package that includes a PIC optically coupled with an optical waveguide within a glass layer, in accordance with various embodiments. Package 600 shows a cross-section side view of a package that includes a glass interposer 602, which may be similar to glass layer 102 of FIG. 1, onto which an optical waveguide 610 is formed using techniques described herein. The optical waveguide 610 may be optically coupled with a die 690, which may be a silicon logic die or a PIC.

The optical waveguide 610 may also be optically coupled with an optical connector 688 that may be physically coupled with the glass interposer 602. In embodiments, the glass interposer 602 may be coupled with an organic substrate 686. In embodiments, the optical waveguide 610 may be optically connected vertically into the PIC 690. Package 670 shows a top-down view of package 600. In embodiments, the glass interposer 602 may include one or more through glass vias (not shown) for electric the connecting the organic substrate 686 with the die 690.

Figure 7:
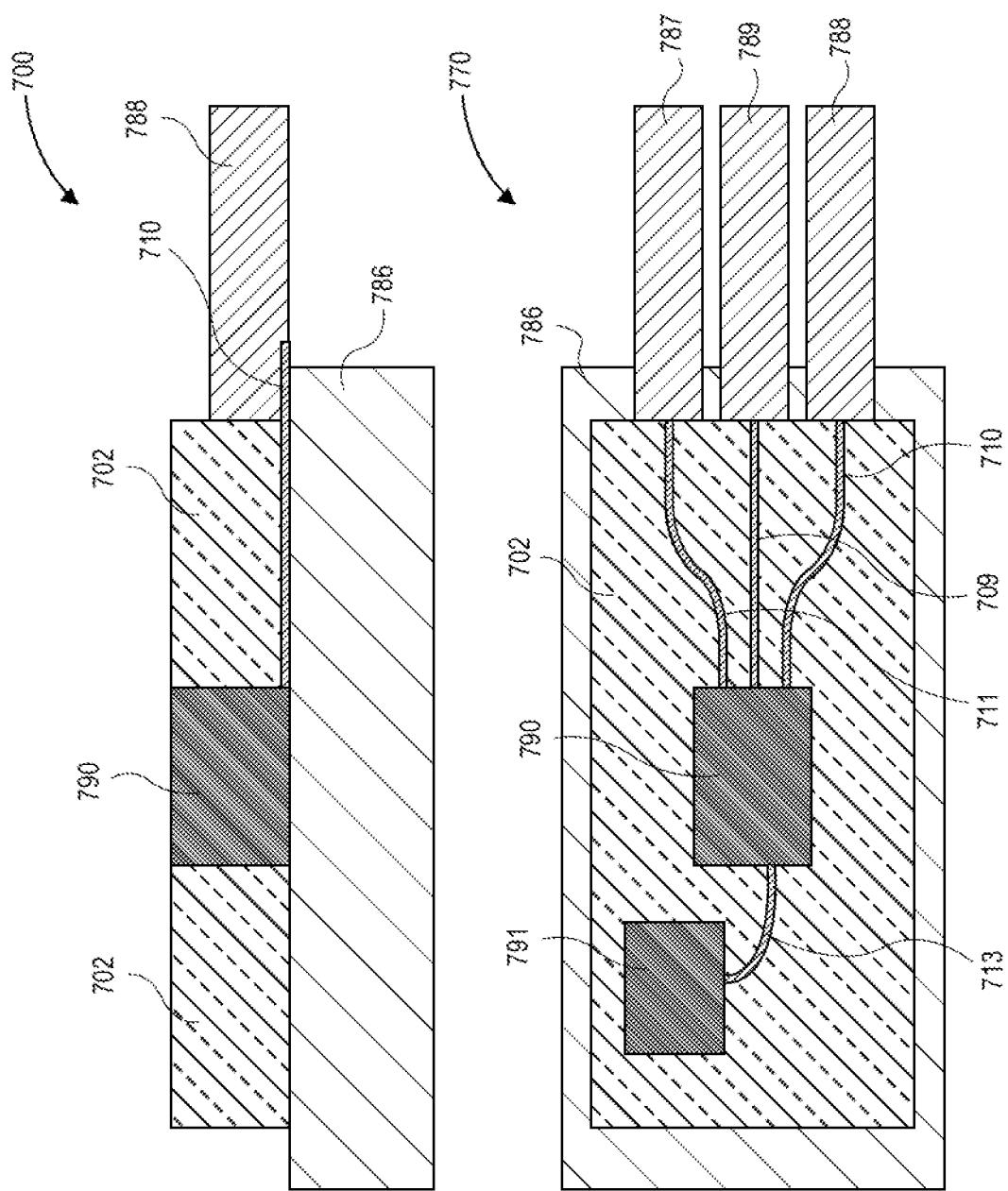
FIG. 7 illustrates a cross-section side view and a top-down view of a package that includes two PICs optically coupled with an optical waveguide within a glass layer, in accordance with various embodiments.
Figure 8:
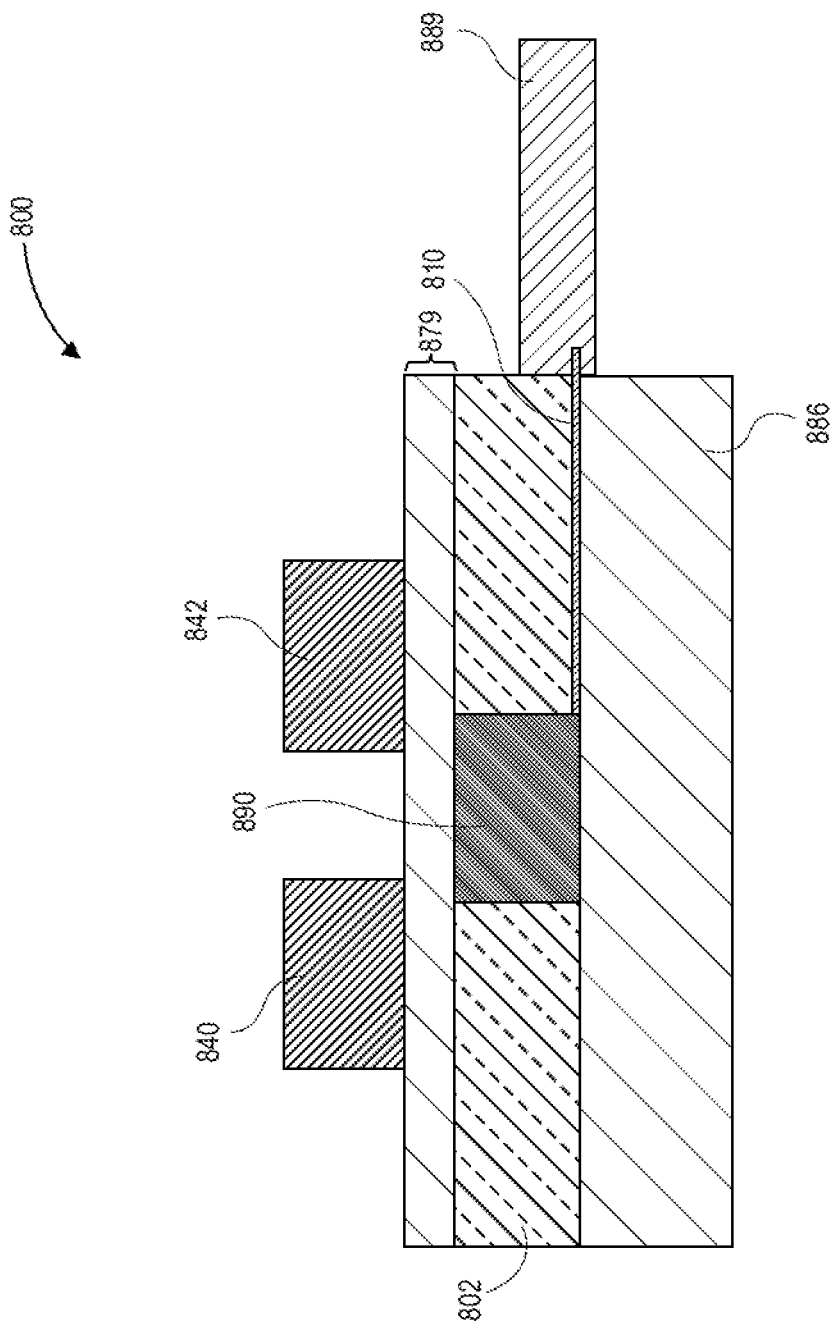
FIG. 8 illustrates a cross-section side view of a package that includes a PIC optically coupled with an optical waveguide within a glass core that includes multiple dies on top of the glass core, in accordance with various embodiments.

With respect to FIGS. 6-8, various coupling methods between the optical waveguide and the PIC may be used. For example, direct lateral coupling, perpendicular coupling using a 90° reflector, evanescent coupling to a directly connected, or buttressed, PIC such as PIC 690, or by a vertical diffraction grating may be used for optical coupling.

FIG. 7 illustrates a cross-section side view and a top-down view of a package that includes two PICs optically coupled with an optical waveguide within a glass layer, in accordance with various embodiments. Package 700 shows a cross-section side view of a package that includes a glass interposer 702, which may be similar to glass layer 102 of FIG. 1, onto which an optical waveguide 710 is formed using techniques as described herein. The optical waveguide 710 may be optically coupled with a die 790, which may be a silicon logic die or a PIC, and may be embedded within a cavity within the glass interposer 702. Here, the optical waveguide 710 may be at a bottom layer of the glass interposer 702.

The optical waveguide 710 may also be optically coupled with an optical connector 788 that may be physically coupled at a side of the glass interposer 702. In embodiments, the glass interposer 702 and the PIC 790 may be coupled with an organic package 786. In embodiments, the optical waveguide 710 may be laterally connected into the PIC 790.

Package 770 shows a top-down view of package 700, and includes additional optical connectors 787, 789 that are optically coupled with the PIC 790 using optical waveguides 711, 709, respectively. Note that optical waveguides 710, 711 include bends, which may be similar to those depicted with respect to FIG. 2. In addition, the PIC 790 may be optically coupled with a second PIC 791 that is also located within a cavity within the glass interposer 702. As shown, the PIC 790 is optically coupled with the second PIC 791 using an additional optical waveguide 713, which may also have a bend. In other embodiments (not shown) a connector such as connector 789 may optically couple with a waveguide such as waveguide 709, which then may split off to interface with multiple dies, such as die 791.

FIG. 8 illustrates a cross-section side view of a package that includes a PIC optically coupled with an optical waveguide within a glass core that includes multiple dies on top of the glass core, in accordance with various embodiments. Package 800 shows a side view that includes a glass core 802, which may be similar to glass layer 102 of FIG. 1. A PIC 890, which may be similar to PIC 790 of FIG. 7, may be positioned within a cavity within the glass core 802. A waveguide 810 may be formed using the techniques and embodiments described herein, at a bottom of the glass core 802 and proximate to an organic package 886, which may be similar to organic package 786 of FIG. 7. An optical connector 889 may be optically coupled with the optical waveguide 810. A buildup layer 879, which may include a redistribution layer (RDL), may be formed on the top of the PIC 890 and the glass core 802, and be electrically coupled with the PIC 890. Dies 840, 842 may be physically and/or electrically coupled with the buildup layer 879.

Figure 9:
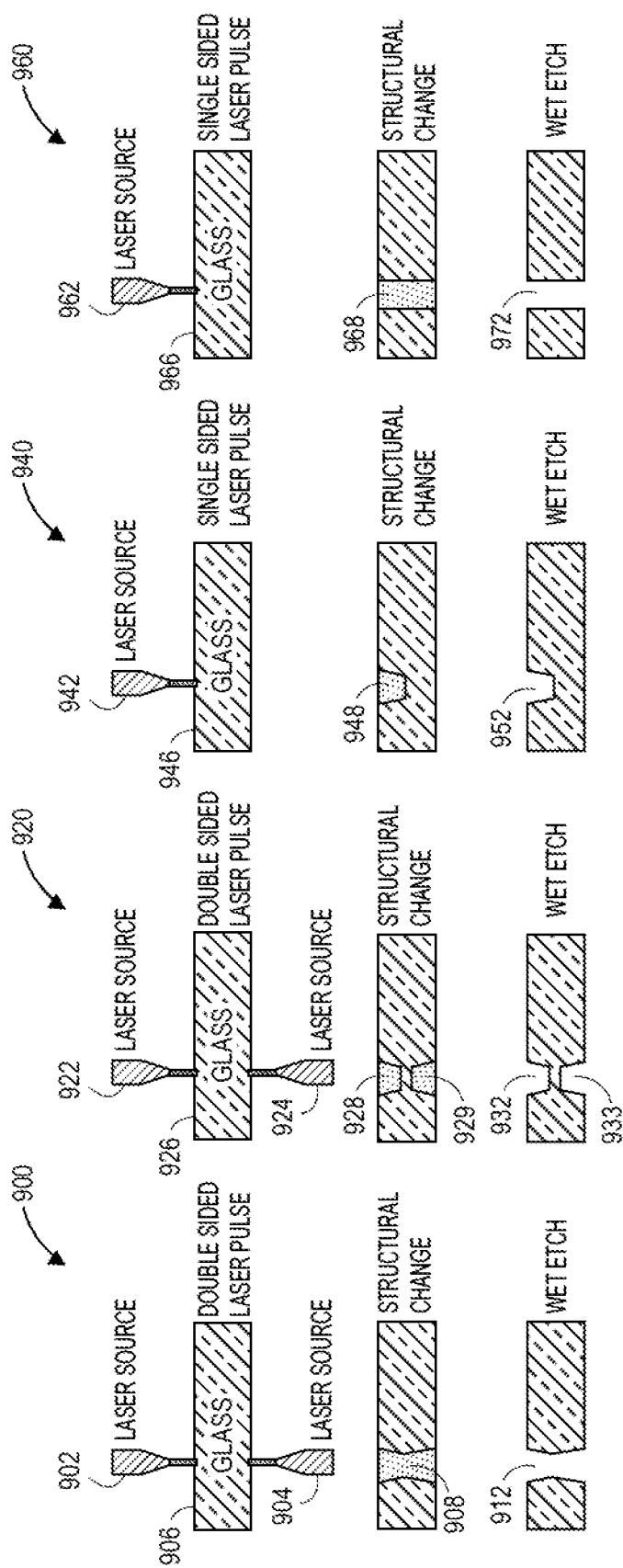
FIG. 9 illustrates multiple examples of laser-assisted etching of glass interconnects processes, in accordance with various embodiments.

FIG. 9 illustrates multiple examples of laser-assisted etching of glass interconnects processes (which may be referred to as "LEGIT" herein), in accordance with embodiments. One use of the LEGIT technique is to provide an alternative substrate core material to the legacy copper clad laminate (CCL) core used in semiconductor packages used to implement products such as servers, graphics, clients, 5G, and the like. By using laser-assisted etching, crack free, high density via drills, hollow shapes may be formed into a glass substrate. In embodiments, different process parameters may be adjusted to achieve drills of various shapes and depths, thus opening the door for innovative devices, architectures, processes, and designs in glass. Embodiments, such as the bridge discussed herein, may also take advantage of these techniques.

Diagram 900 shows a high level process flow for a through via and blind via (or trench) in a microelectronic package substrate (e.g. glass) using LEGIT to create a through via or a blind via. A resulting volume/shape of glass with laser-induced morphology change that can then be selectively etched to create a trench, a through hole or a void that can be filled with conductive material. A through via 912 is created by laser pulses from two laser sources 902, 904 on opposite sides of a glass wafer 906. As used herein, a through drill and a through via refers to when the drill or the via starts on one side of the glass/substrate and ends on the other side. A blind drill and a blind via refers to when the drill or the via starts on the surface of the substrate and stops half way inside the substrate. In embodiments, the laser pulses from the two laser sources 902, 904 are applied perpendicularly to the glass wafer 906 to induce a morphological change 908, which may also be referred to as a structural change, in the glass that encounters the laser pulses. This morphological change 908 includes changes in the molecular structure of the glass to make it easier to etch out (remove a portion of the glass). In embodiments, a wet etch process may be used.

Diagram 920 shows a high level process flow for a double blind shape. A double blind shape 932, 933 may be created by laser pulses from two laser sources 922, 924, which may be similar to laser sources 902, 904, that are on opposite sides of the glass wafer 926, which may be similar to glass wafer 906. In this example, adjustments may be made in the laser pulse energy and/or the laser pulse exposure time from the two laser sources 922, 924. As a result, morphological changes 928, 929 in the glass 926 may result, with these changes making it easier to etch out portions of the glass. In embodiments, a wet etch process may be used.

Diagram 940 shows a high level process flow for a single-blind shape, which may also be referred to as a trench. In this example, a single laser source 942 delivers a laser pulse to the glass wafer 946 to create a morphological change 948 in the glass 946. As described above, these morphological changes make it easier to etch out a portion of the glass 952. In embodiments, a wet etch process may be used.

Diagram 960 shows a high level process flow for a through via shape. In this example, a single laser source 962 applies a laser pulse to the glass 966 to create a morphological change 968 in the glass 966, with the change making it easier to etch out a portion of the glass 972. As shown here, the laser pulse energy and/or laser pulse exposure time from the laser source 962 has been adjusted to create an etched out portion 972 that extends entirely through the glass 966.

With respect to FIG. 9, although embodiments show laser sources 902, 904, 922, 924, 942, 962 as perpendicular to a surface of the glass 906, 926, 946, 966, in embodiments, the laser sources may be positioned at an angle to the surface of the glass, with pulse energy and/or pulse exposure time variations in order to cause a diagonal via or a trench, or to shape the via, such as 912, 972, for example to make it cylindrical, tapered, or include some other feature. In addition, varying the glass type may also cause different features within a via or a trench as the etching of glass is strongly dependent on the chemical composition of the glass.

In embodiments using the process described with respect to FIG. 9, through hole vias 912, 972 may be created that are less than 10 µm in diameter, and may have an aspect ratio of 40:1 to 50:1. As a result, a far higher density of vias may be placed within the glass and be placed closer to each other at a fine pitch. In embodiments, this pitch may be 50 µm or less. After creating the vias or trenches, a metallization process may be applied in order to create a conductive pathway through the vias or trenches, for example a plated through hole (PTH). Using these techniques, finer pitch vias may result in better signaling, allowing more I/O signals to be routed through the glass wafer and to other coupled components such as a substrate.

Figure 10:
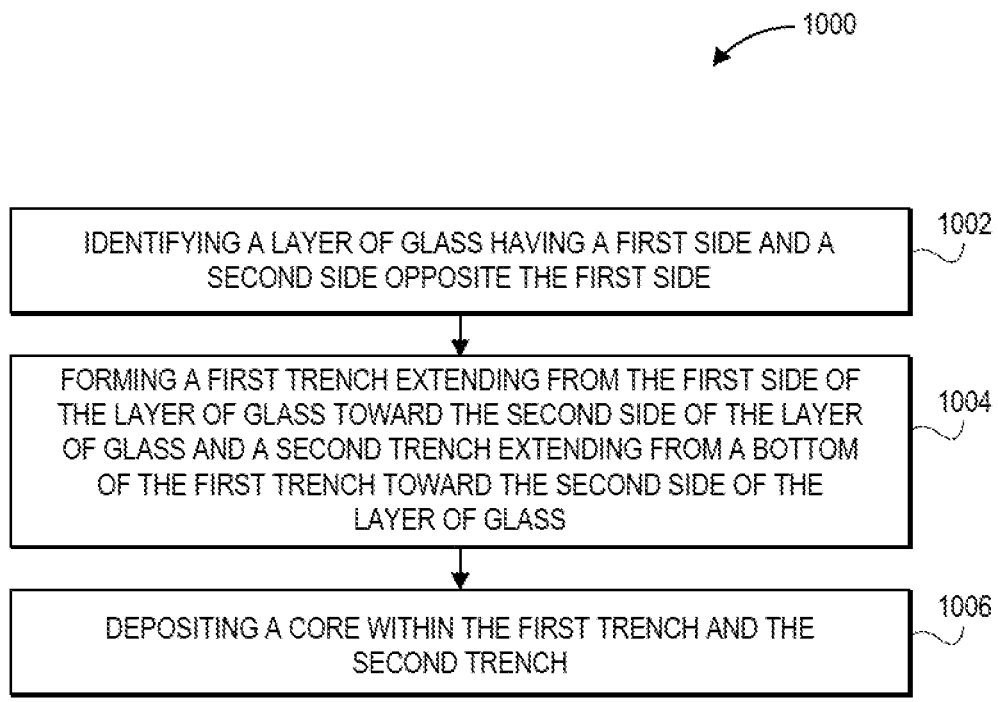
FIG. 10 illustrates an example of a process for forming an optical waveguide in a glass layer, in accordance with various embodiments.

FIG. 10 illustrates an example of a process for forming an optical waveguide within a layer of glass. Process 1000 may be performed using the techniques, methods, systems, and/or apparatus as described with respect to FIGS. 1-9.

At block 1002, the process may include identifying a layer of glass having a first side and a second side opposite the first side.

At block 1004, the process may further include forming a first trench extending from the first side of the layer of glass toward the second side of the layer of glass and a second trench extending from a bottom of the first trench toward the second side of the layer of glass.

At block 1006, the process may further include depositing a core within the first trench and the second trench.

Figure 11:
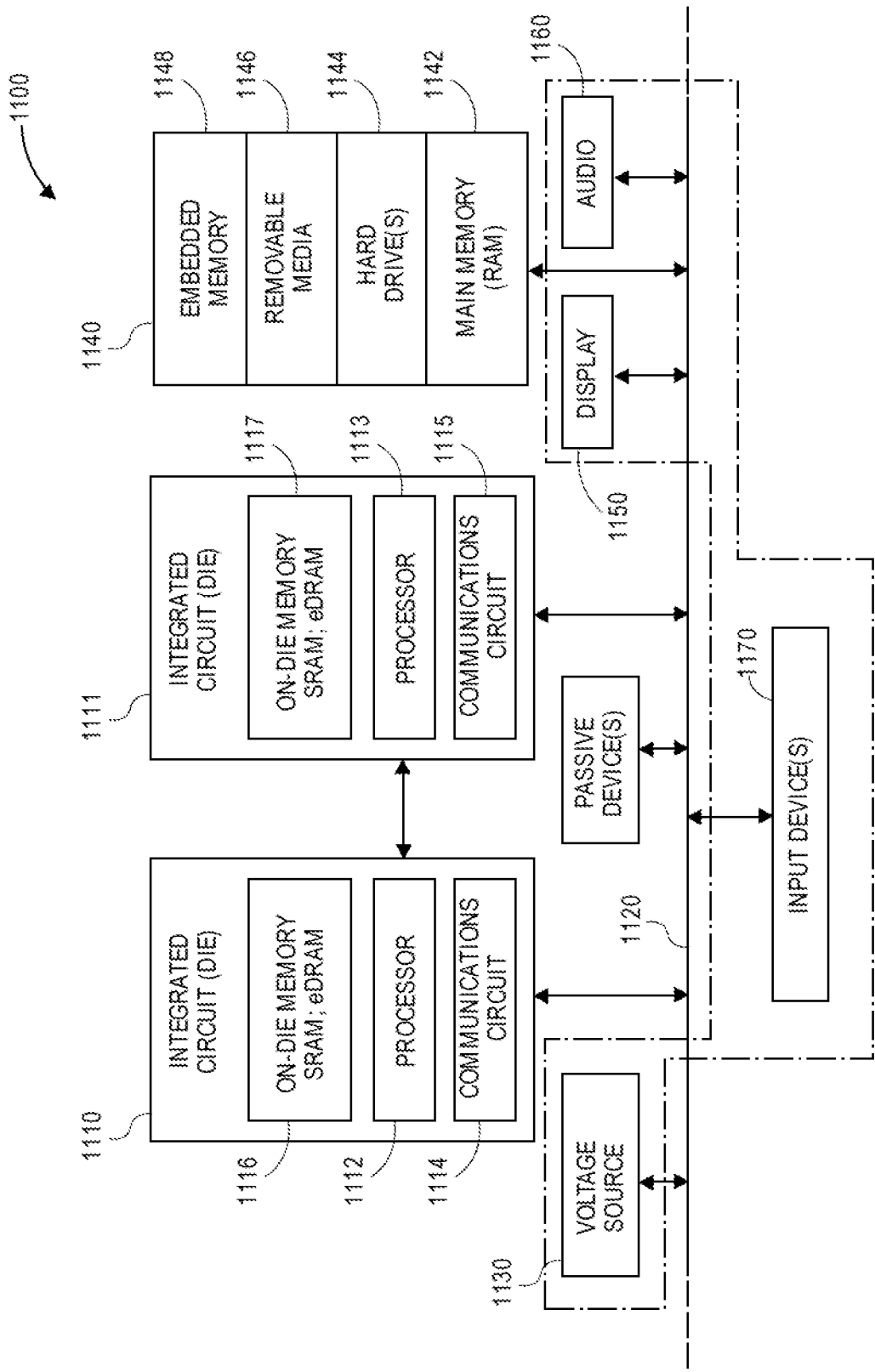
FIG. 11 schematically illustrates a computing device, in accordance with various embodiments.

FIG. 11 is a schematic of a computer system 1100, in accordance with an embodiment of the present invention. The computer system 1100 (also referred to as the electronic system 1100) as depicted can embody an optical waveguide formed within a glass layer, according to any of the several disclosed embodiments and their equivalents as set forth in this disclosure. The computer system 1100 may be a mobile device such as a netbook computer. The computer system 1100 may be a mobile device such as a wireless smart phone. The computer system 1100 may be a desktop computer. The computer system 1100 may be a hand-held reader. The computer system 1100 may be a server system. The computer system 1100 may be a supercomputer or high-performance computing system.

In an embodiment, the electronic system 1100 is a computer system that includes a system bus 1120 to electrically couple the various components of the electronic system 1100. The system bus 1120 is a single bus or any combination of busses according to various embodiments. The electronic system 1100 includes a voltage source 1130 that provides power to the integrated circuit 1110. In some embodiments, the voltage source 1130 supplies current to the integrated circuit 1110 through the system bus 1120.

The integrated circuit 1110 is electrically coupled to the system bus 1120 and includes any circuit, or combination of circuits according to an embodiment. In an embodiment, the integrated circuit 1110 includes a processor 1112 that can be of any type. As used herein, the processor 1112 may mean any type of circuit such as, but not limited to, a microprocessor, a microcontroller, a graphics processor, a digital signal processor, or another processor. In an embodiment, the processor 1112 includes, or is coupled with, an optical waveguide formed within a glass layer, as disclosed herein. In an embodiment, SRAM embodiments are found in memory caches of the processor. Other types of circuits that can be included in the integrated circuit 1110 are a custom circuit or an application-specific integrated circuit (ASIC), such as a communications circuit 1114 for use in wireless devices such as cellular telephones, smart phones, pagers, portable computers, two-way radios, and similar electronic systems, or a communications circuit for servers. In an embodiment, the integrated circuit 1110 includes on-die memory 1116 such as static random-access memory (SRAM). In an embodiment, the integrated circuit 1110 includes embedded on-die memory 1116 such as embedded dynamic random-access memory (eDRAM).

In an embodiment, the integrated circuit 1110 is complemented with a subsequent integrated circuit 1111. Useful embodiments include a dual processor 1113 and a dual communications circuit 1115 and dual on-die memory 1117 such as SRAM. In an embodiment, the dual integrated circuit 1110 includes embedded on-die memory 1117 such as eDRAM.

In an embodiment, the electronic system 1100 also includes an external memory 1140 that in turn may include one or more memory elements suitable to the particular application, such as a main memory 1142 in the form of RAM, one or more hard drives 1144, and/or one or more drives that handle removable media 1146, such as diskettes, compact disks (CDs), digital variable disks (DVDs), flash memory drives, and other removable media known in the art. The external memory 1140 may also be embedded memory 1148 such as the first die in a die stack, according to an embodiment.

In an embodiment, the electronic system 1100 also includes a display device 1150, an audio output 1160. In an embodiment, the electronic system 1100 includes an input device such as a controller 1170 that may be a keyboard, mouse, trackball, game controller, microphone, voice-recognition device, or any other input device that inputs information into the electronic system 1100. In an embodiment, an input device 1170 is a camera. In an embodiment, an input device 1170 is a digital sound recorder. In an embodiment, an input device 1170 is a camera and a digital sound recorder.

As shown herein, the integrated circuit 1110 can be implemented in a number of different embodiments, including a package substrate having an optical waveguide formed within a glass layer, according to any of the several disclosed embodiments and their equivalents, an electronic system, a computer system, one or more methods of fabricating an integrated circuit, and one or more methods of fabricating an electronic assembly that includes a package substrate having an optical waveguide formed within a glass layer, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed package substrates having an optical waveguide formed within a glass layer embodiments and their equivalents. A foundation substrate may be included, as represented by the dashed line of FIG. 11. Passive devices may also be included, as is also depicted in FIG. 11.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following paragraphs describe examples of various embodiments.

EXAMPLES

Example 1 is an optical waveguide comprising: a layer of glass having a first side and a second side opposite the first side; a first trench extending from the first side of the layer of glass toward the second side of the layer of glass, a bottom of the first trench at a first depth from the first side of the layer of glass; a second trench extending from the bottom of the first trench toward the second side of the layer of glass, a bottom of the second trench at a second depth from the first side of the layer of glass; and a core material disposed within the first trench and the second trench.

Example 2 includes the optical waveguide of example 1, wherein a surface of the core material is coplanar with the first side of the layer of glass.

Example 3 includes the optical waveguide of example 2, wherein a cladding is coupled with the surface of the core material.

Example 4 includes the optical waveguide of example 3, wherein the cladding covers a portion of the first side of the layer of glass.

Example 5 includes the optical waveguide of example 3, wherein the cladding includes inorganic material.

Example 6 includes the optical waveguide of example 1, wherein the first trench is parallel with the second trench.

Example 7 includes the optical waveguide of example 1, wherein the core material includes inorganic material.

Example 8 includes the optical waveguide of any one of examples 1-7, wherein the first trench has a first wall and a second wall opposite the first wall, and wherein the second trench has a first wall and a second wall opposite the first wall, and wherein a distance between the first wall of the first trench and the first wall of the second trench proximate to the first wall of the first trench is a first distance, and wherein a distance between the second wall of the first trench and the second wall of the second trench proximate to the second wall of the first trench is a second distance; and wherein the first distance is not equal to the second distance.

Example 9 includes the optical waveguide of example 8, wherein a path of the first trench and of the second trench changes direction within a plane parallel to the first side of the glass layer.

Example 10 includes the optical waveguide of example 8, wherein the first wall and the second wall of the first trench and the first wall and the second wall of the second trench are substantially perpendicular to the first side of the layer of glass.

Example 11 is a method comprising: identifying a layer of glass having a first side and a second side opposite the first side; forming a first trench extending from the first side of the layer of glass toward the second side of the layer of glass and a second trench extending from a bottom of the first trench toward the second side of the layer of glass; and depositing a core within the first trench and the second trench.

Example 12 includes the method of example 11, wherein a surface of the core is coplanar with the first side of the layer of glass.

Example 13 includes the method of example 11, further comprising depositing a cladding on top of the deposited core.

Example 14 includes the method of any one of examples 11-13, wherein the layer of glass is photo structural glass; and wherein forming a first trench and a second trench further includes: exposing a volume of the layer of glass at the first side of the layer of glass to light; and removing the exposed volume of the layer of glass.

Example 15 includes the method of example 14, wherein exposing the volume of the layer of glass to light further includes exposing the volume of the layer of glass to ultraviolet light; and wherein removing the exposed volume of the layer of glass further includes thermal annealing the exposed volume of the layer of glass.

Example 16 includes the method of example 14, wherein the ultraviolet light is generated by a ultraviolet femtosecond laser.

Example 17 is a package comprising: a photonic integrated circuit (PIC) coupled with a layer of glass; an optical waveguide optically coupled with the PIC, the optical waveguide comprising: a first trench extending from a first side of the layer of glass toward a second side of the layer of glass opposite the first side of the layer of glass, a bottom of the first trench at a first depth from the first side of the layer of glass; a second trench extending from the bottom of the first trench toward the second side of the layer of glass; and a core material disposed within the first trench and the second trench.

Example 18 includes the package of example 17, wherein the PIC is disposed within a cavity within the layer of glass.

Example 19 includes the package of example 17, wherein the PIC is disposed on a surface of the layer of glass.

Example 20 includes the package of example 17, further comprising an optical connector optically coupled with the layer of glass.

Example 21 includes the package of example 20, wherein the optical connector is a first optical connector, and the optical waveguide is a first optical waveguide; and further comprising: a second optical connector optically coupled with a second optical waveguide, the second optical waveguide optically coupled to the PIC.

Example 22 includes the package of example 17, wherein the layer of glass is a portion of an interposer.

Example 23 includes the package of example 17, wherein the layer of glass is coupled with an organic package.

Example 24 includes the package of example 17, wherein the PIC is a first PIC and the optical waveguide is a first optical waveguide; and further comprising: a second PIC coupled with the layer of glass; and a second optical waveguide optically coupling the first PIC and the second PIC.

Example 25 includes the package of example 17, wherein the optical waveguide bends within a plane parallel to the first side of the glass layer.

Example 26 includes the package of any one of example 17-25, wherein the optical waveguide further includes a cladding coupled with a surface of the core material.

What is claimed is:

1. An optical waveguide comprising:
a layer of glass having a first side and a second side opposite the first side;
a first trench extending from the first side of the layer of glass toward the second side of the layer of glass, a bottom of the first trench at a first depth from the first side of the layer of glass;
a second trench extending from the bottom of the first trench toward the second side of the layer of glass, a bottom of the second trench at a second depth from the first side of the layer of glass, wherein a portion of the second trench is asymmetric from a corresponding portion of the first trench; and
a core material disposed within the first trench and the second trench.

2. The optical waveguide of claim 1, wherein a surface of the core material is coplanar with the first side of the layer of glass.

3. The optical waveguide of claim 2, wherein a cladding is coupled with the surface of the core material.

4. The optical waveguide of claim 3, wherein the cladding covers a portion of the first side of the layer of glass.

5. The optical waveguide of claim 3, wherein the cladding includes inorganic material.

6. The optical waveguide of claim 1, wherein the first trench is parallel with the second trench.

7. The optical waveguide of claim 1, wherein the core material includes inorganic material.

8. The optical waveguide of claim 1, wherein the first trench has a first wall and a second wall opposite the first wall, and wherein the second trench has a first wall and a second wall opposite the first wall, and wherein a distance between the first wall of the first trench and the first wall of the second trench proximate to the first wall of the first trench is a first distance, and wherein a distance between the second wall of the first trench and the second wall of the second trench proximate to the second wall of the first trench is a second distance; and
wherein the first distance is not equal to the second distance.

9. The optical waveguide of claim 8, wherein a path of the first trench and of the second trench changes direction within a plane parallel to the first side of the glass layer.

10. The optical waveguide of claim 8, wherein the first wall and the second wall of the first trench and the first wall and the second wall of the second trench are substantially perpendicular to the first side of the layer of glass.

11. A method comprising:
providing a layer of glass having a first side and a second side opposite the first side;
forming a first trench extending from the first side of the layer of glass toward the second side of the layer of glass and a second trench extending from a bottom of the first trench toward the second side of the layer of glass, wherein a portion of the second trench is asymmetric from a corresponding portion of the first trench; and
depositing a core within the first trench and the second trench.

12. The method of claim 11, wherein a surface of the core is coplanar with the first side of the layer of glass.

13. The method of claim 11, further comprising depositing a cladding on top of the deposited core.

14. The method of claim 11, wherein the layer of glass is photo structural glass; and wherein forming a first trench and a second trench further includes:
exposing a volume of the layer of glass at the first side of the layer of glass to light; and
removing the exposed volume of the layer of glass.

15. The method of claim 14, wherein exposing the volume of the layer of glass to light further includes exposing the volume of the layer of glass to ultraviolet light; and
wherein removing the exposed volume of the layer of glass further includes thermal annealing the exposed volume of the layer of glass.

16. The method of claim 14, wherein the ultraviolet light is generated by a ultraviolet femtosecond laser.

17. A package comprising:
a photonic integrated circuit (PIC) coupled with a layer of glass; and
an optical waveguide optically coupled with the PIC, the optical waveguide comprising:
a first trench extending from a first side of the layer of glass toward a second side of the layer of glass opposite the first side of the layer of glass, a bottom of the first trench at a first depth from the first side of the layer of glass;
a second trench extending from the bottom of the first trench toward the second side of the layer of glass, wherein a portion of the second trench is asymmetric from a corresponding portion of the first trench; and
a core material disposed within the first trench and the second trench.

18. The package of claim 17, wherein the PIC is disposed within a cavity within the layer of glass.

19. The package of claim 17, wherein the PIC is disposed on a surface of the layer of glass.

20. The package of claim 17, further comprising an optical connector optically coupled with the layer of glass.

21. The package of claim 20, wherein the optical connector is a first optical connector, and the optical waveguide is a first optical waveguide; and further comprising:
a second optical connector optically coupled with a second optical waveguide, the second optical waveguide optically coupled to the PIC.

22. The package of claim 17, wherein the layer of glass is a portion of an interposer.

23. The package of claim 17, wherein the PIC is a first PIC and the optical waveguide is a first optical waveguide; and further comprising:
a second PIC coupled with the layer of glass; and
a second optical waveguide optically coupling the first PIC and the second PIC.

24. The package of claim 17, wherein the optical waveguide bends within a plane parallel to the first side of the glass layer.

25. The package of claim 17, wherein the optical waveguide further includes a cladding coupled with a surface of the core material.

* * * * *